(No Model.)  5 Sheets—Sheet 1.
H. SEIFERT.
COIN CONTROLLED APPARATUS.
No. 537,906.  Patented Apr. 23, 1895.
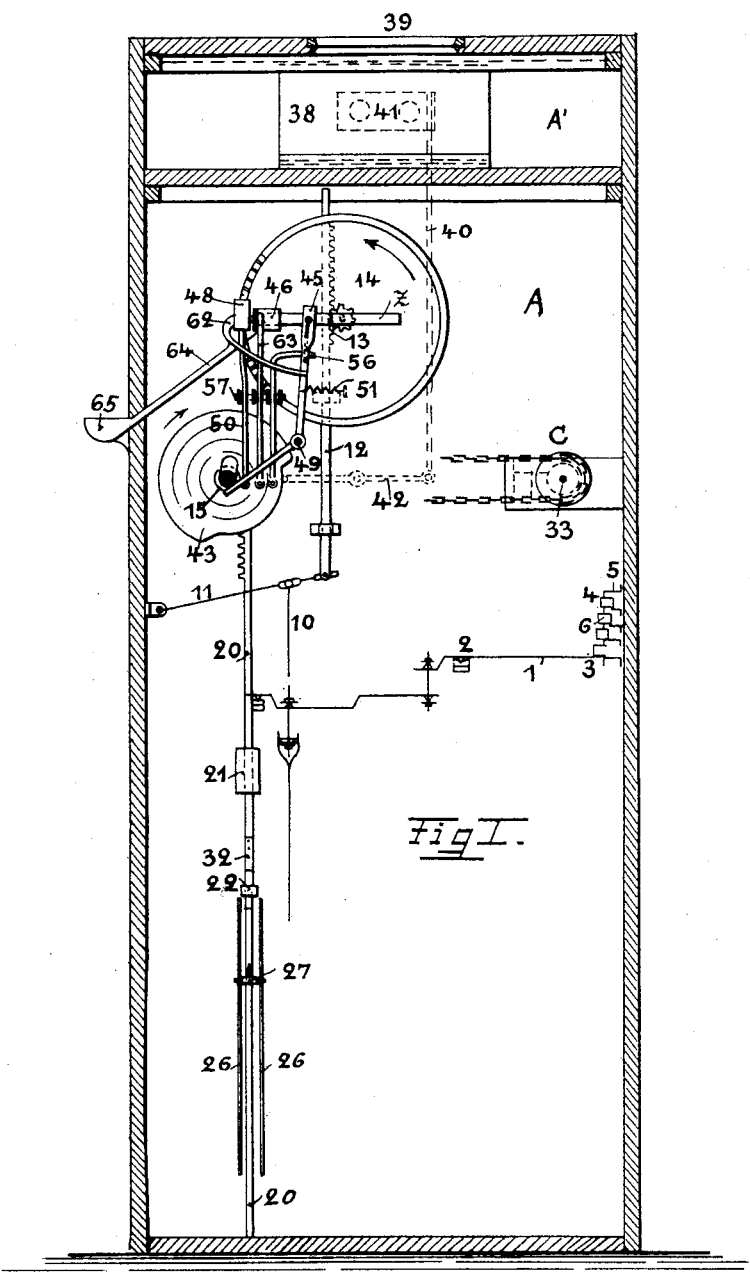
Fig. I.

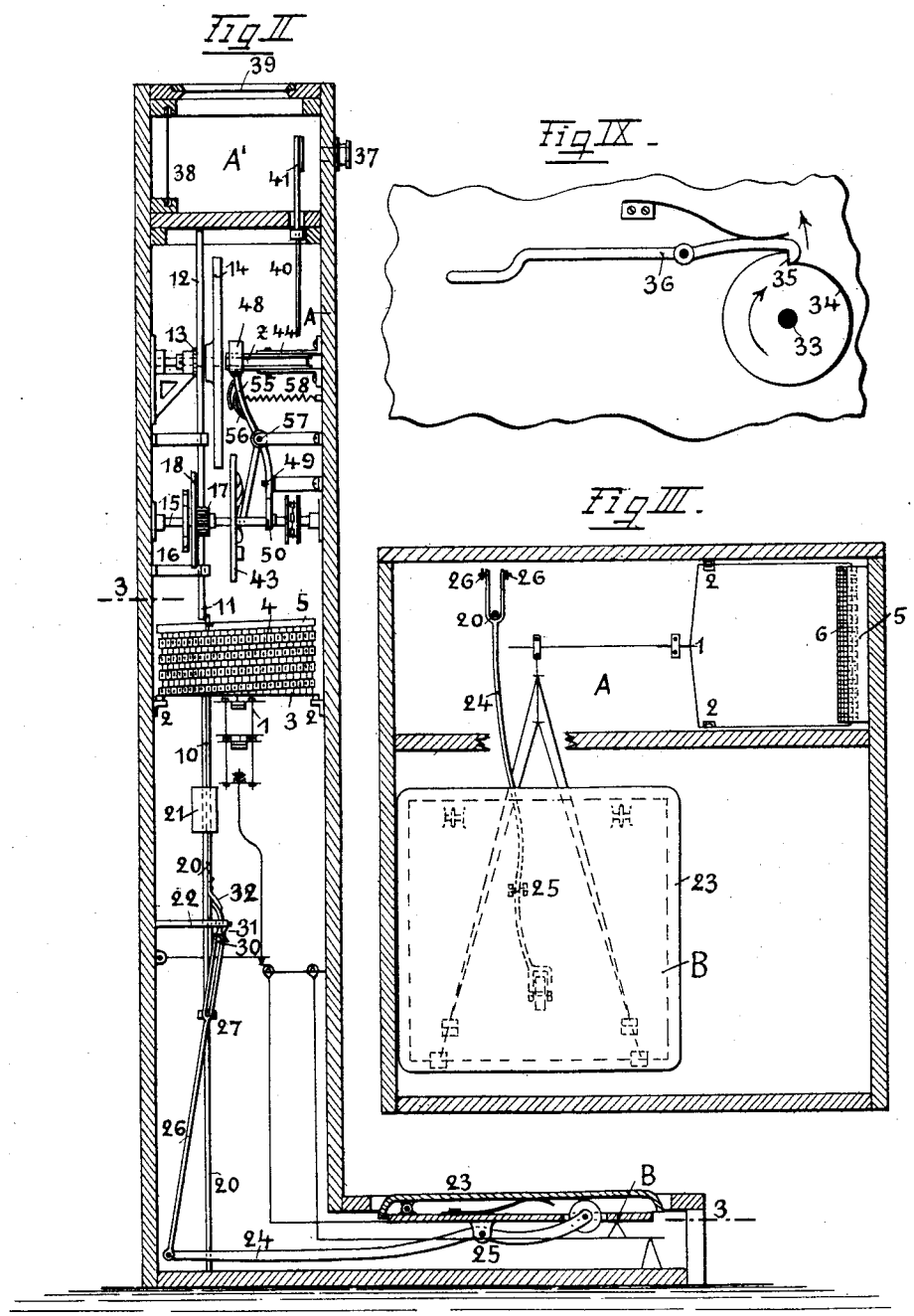

(No Model.) 5 Sheets—Sheet 3.
H. SEIFERT.
COIN CONTROLLED APPARATUS.
No. 537,906. Patented Apr. 23, 1895.
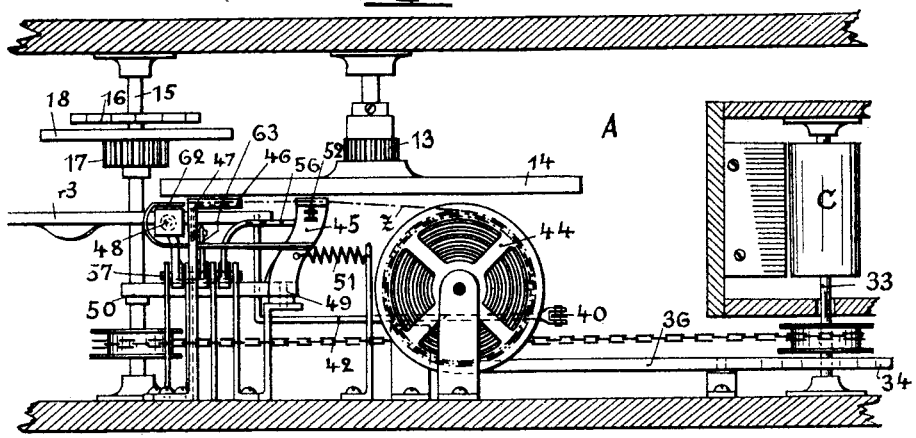
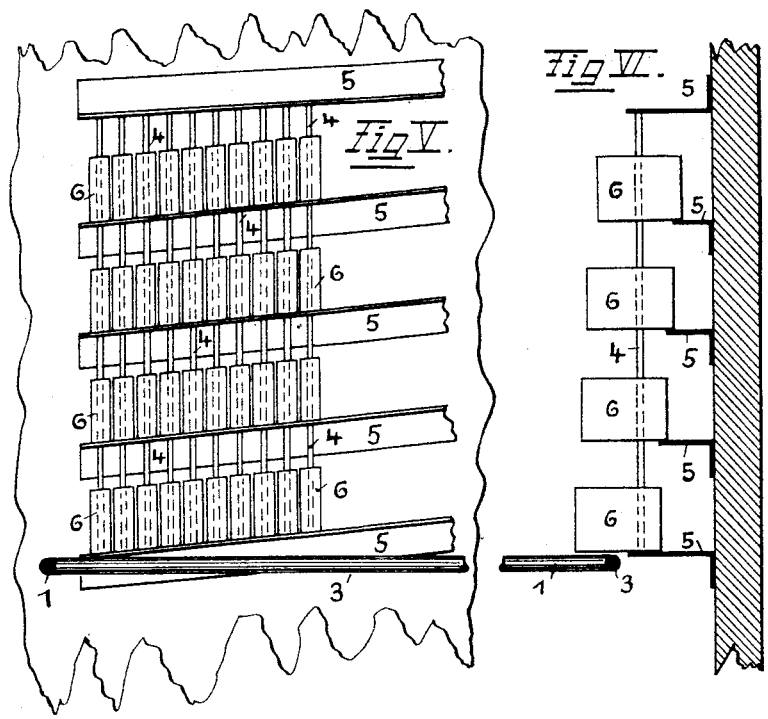
Witnesses:
A. B. Dreggis
L. D. Heinrichs
Inventor: Hermann Seifert
per G. Dettmar
Attorney.
THE NORRIS PETERS CO., PHOTO-LITHO., WASHINGTON, D. C.

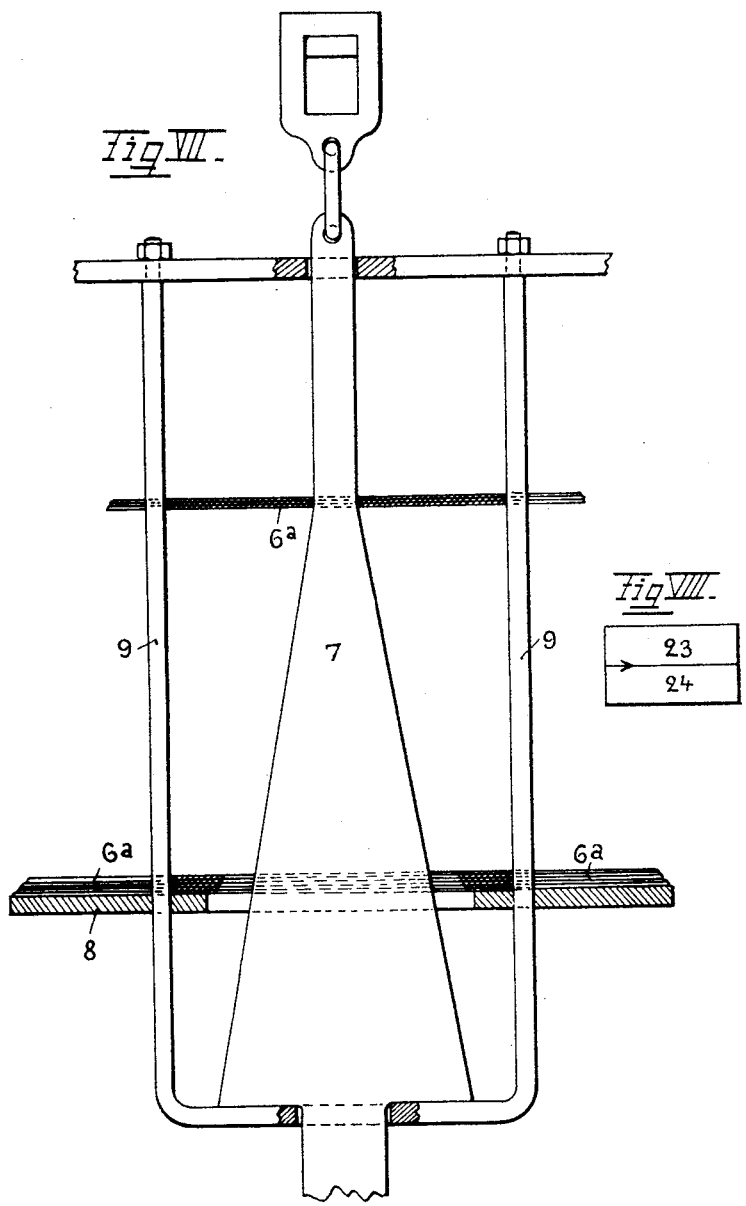

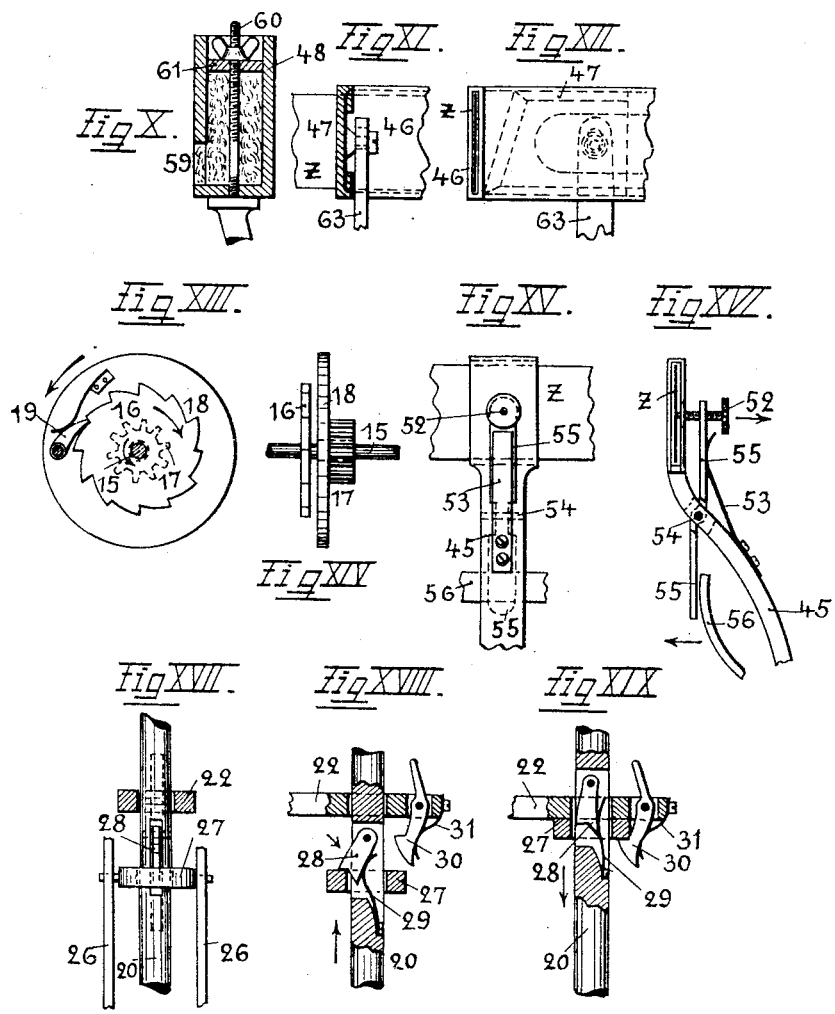

UNITED STATES PATENT OFFICE.

HERMANN SEIFERT, OF DEBSCHWITZ, GERMANY.

COIN-CONTROLLED APPARATUS.

SPECIFICATION forming part of Letters Patent No. 537,906, dated April 23, 1895.

Application filed August 27, 1894. Serial No. 521,446. (No model.)

*To all whom it may concern:*

Be it known that I, HERMANN SEIFERT, a subject of the Emperor of Germany, residing at Debschwitz, near Gera, Reuss, Germany, have invented certain new and useful Improvements in Coin-Controlled Apparatus; and I do hereby declare that the following is a full, clear, and exact description thereof.

This invention relates to improvements in coin-operating mechanism and has for its object the automatic weighing of individuals, the indication of the weights by printed slips, or cards, and the delivery of said cards; also combining therewith apparatus for displaying stereoscopic views, and with music producing mechanism, all of which is arranged for operating simultaneously, as hereinafter described.

The novel feature of my invention consists in the arrangement of parts whereby the apparatus is wound up, by the weight of a person standing on the weighing-platform, and put in operation by the dropping of a coin, through a slot, as in the well known vending machines.

It further consists in certain arrangements and combinations of parts all of which are hereinafter fully described and specifically claimed.

Referring to the accompanying drawings, Figure 1 is a vertical section parallel with the front of the apparatus. Fig. 2 is a vertical section, at right angles to Fig. 1. Fig. 3 is a horizontal section on line 3, 3, of Fig. 2. Fig. 4 is a horizontal section through the upper part of the apparatus, showing on an enlarged scale, the actuating device, the printing, feeding, and paper-cutting mechanism, and the musical instrument. Figs. 5 and 6, also enlarged, represent one special form of weighing device with weights designed to be elevated gradually and in succession. Fig. 7 shows a modification of weighing device. Fig. 8 represents a slip, or card, with numeral thereon, to designate weights. Figs. 9 to 19, are enlarged details to which reference is hereinafter made.

The weighing portion of my apparatus consists of a balance scale built according to the decimal system, but with the difference that a weight of 0.05 kilograms represents a charge of one kilogram. This arrangement permits of accurate weighing, within a very limited space.

A description of the lever-system of the scale, is not deemed necessary, as it is anologous to the ordinary decimal scale, but I shall now describe as novel the two forms designed for automatically taking-up the weights.

In the first form Figs. 1, 2, 3, 5 and 6, the numeral 1 designates a lever-frame, fulcrumed at 2, and provided at its rear with an end bar 3 which is designed to operate below a series of angle-plates 5, having different projections, and which are fastened to the wall of the casing A so that the front edges of the angle-plates shall form an incline, with the smallest projection uppermost. The projecting portions of the aforesaid angle-plates form rests for the weights 6, which are of uniform size and which are adapted to operate, vertically, on guide rods 4. The weights are of fifty grams each, thus representing one kilogram of the charge. The slanting rows of weights are arranged with reference to each other, so that the bottom of the lower weight, in each consecutive upper row, shall be so much above the upper edge of the last, or upper weight of the row next below, as the latter is above its adjacent lower weight. Thus, the relative elevation of the weights, as arranged, is precisely the same as if the weights were placed in one continuous inclined plane.

During the process of weighing the crossbar 3 of the lever frame 1, will first lift the lower row of weights, bringing the first weight against the bottom of the first weight of the second row, pushing same upward, and in like manner raising the balance of the second row as the weights of the first row are successively brought to bear against the weights above same. In like manner the weights of each upper row, are raised by the weights of the row next below. The projection of the angle plates, being on an incline, give sufficient clearance for the ascent of the weights. Whenever a sufficient number of weights have been raised, to balance the weight on the scale-platform, the action of the lever-frame will cease, the said frame raising only the requisite number of weights to produce an equilibrium.

The movement of the lever-frame 1, from weight to weight, is scaled on a type-wheel, which is hereinafter fully described.

According to the modified form for taking-up the weights, see Fig. 7, a flat wedge-shaped piece 7, is suspended from the lever-frame 1. In this case the weights $6^a$ are provided with central slots equal in width to the thickness of the wedge piece 7, but of different lengths, so as to be raised successively by the wedge shaped piece. The lowest weight is designed to rest on a stationary plate 8. Vertical rods 9 of suitable weight serve as guides for the device which moving upward, carries with it, a sufficient number of weights to counterbalance the weight on the scale-platform. The rod 10 of the weighing device engages the lever 11, see Fig. 1, by which the vertical sliding-rack 12 is operated, being in gear with the pinion 13, of the shaft of type-wheel 14, Figs. 1 and 2. Thus the type-wheel is turned to correspond with the movement of the scales.

The form of type-wheel and printing arrangement will be described hereinafter.

The actuating mechanism which is wound-up, or operated, by the weight on the platform of the scale, and which is disengaged, or tripped by a coin, of requisite weight being dropped thereon, is represented in Figs. 1, 2, 4, 13, and 14. A main-shaft 15 has a ratchet-wheel 16, keyed thereon and is also provided with a loosely fitting pinion 17 and disk 18. A spring actuated pawl 19, is designed to engage the teeth of the ratchet-wheel 16 and be released therefrom when said wheel is turned in an opposite direction. The rack 20, see Fig. 1, engaging pinion 17, is sufficiently weighted, as shown at 21, to set the actuating mechanism in motion when it descends. The lower end of the rack operates in a guide arm 22. See Figs. 1, 2, 17, 18 and 19.

The winding-up of the actuating mechanism from the platform B of the scale, is effected as follows: A plate 23, Figs. 2 and 3, is pivotally connected with the platform B, held in upright position by a light spring, as shown. When a person steps on this plate 23, the lever 24 will operate on fulcrum 25 of platform B causing its free arm to ascend. This arm terminates in a yoke, see Fig. 3, to the ends of which are connected the rods 26, having slotted upper ends, as shown in Fig. 2, for receiving the trunnions of a ring 27 adapted to slide, freely, on the rod 20. This rod is provided with a longitudinal slot in which is pivoted a dog 28. A spring 29 is secured at the bottom of the slot, so as to act against the dog and press same outward, as shown in Fig. 18, and thus be engaged by the ring 27 and thereby raised, as the rods 26 are moved upward, by the tilting of the lever 24. The upward movement is limited by the arm 22 the guide hole of which will force the dog inside its slot, as in Fig. 19. While this movement is being effected, the ring 27 presses outward the lower end of pawl 30, until passing beyond the hook thereof, when it is secured by said hook by reason of the action of spring 31. Thus the ring 27 will be kept close to arm 22 and prevent the dog 28 finding a support on the edge of its bore. The connection of the ring with the rod 20 being broken, the actuating device is wound up, and can now be set in motion by the dropping of a coin. By this arrangement the rod 20, being independent of the scales, will always be lifted to the same height, and when raised, will have no further influence on the process of weighing. Its proper weight, predetermined in the construction and always constant, will of course act, but it is no more in connection with the rest of the mechanism of the scales. During the movement of the scales, the rods 26 will oscillate on the trunnions of the ring 27. The latter is made free again by the descent of the rod 20, after its disengagement from the running-gear, by a projection 32, Fig. 2, of rod 20, which during its downward stroke strikes the upturned end of pawl 30 and thus withdraws the hook from under the ring. For disengagement of the running-gear, or actuating mechanism, the ordinary lever, weighted by the thrown in coin, may be made to act upon the mainshaft 15. The construction shows, however, that it does not act directly on said shaft, but upon the shaft 33, which is connected with shaft 15 by chain and chain-wheels, or other suitable means may be employed for said purpose.

The shaft 33 which operates the musical instrument C, Figs. 4 and 9, carries a disk 34 having a projecting tooth 35 the rear of which connects, in a spiral line, with the periphery of the disk. The hook of lever 36 is designed for engaging the tooth 35. To insure this action it is held against the periphery of the disk, by a light-spring, as shown in Fig. 9. The free end of the lever 36 is widened, or suitably shaped, to receive the coin, by the weight of which it is tilted and its hook disengaged, thus starting the disk, on the periphery of which it again falls to re-engage the tooth of the disk. The disengaging device is one of the many forms which may be employed, without departing from the spirit of my invention.

The working of the running gear consists in inking the type, brought in position by the operation of the scales, and in printing, and cutting-off the end of a paper ribbon, and also in feeding the paper for other impressions. The secondary functions of the running gear, are the playing of tunes, by starting the musical-instrument C, and the display of stereoscopic views. In addition thereto an electric light may be connected for the purpose of illuminating the views, the light being produced by any convenient source of electricity and the contact to be closed by the aforesaid running-gear. The stereoscopic portion of the apparatus is arranged in the upper part A' of the casing A so that the glasses 37 shall be about the height of the eyes of a person standing on the platform of the scales. The picture to be exhibited is adapted to slide in grooves at the rear of the upper part of the casing, as shown at 38. The light is admitted to the picture compartment through a glass-plate 39. A blind 41 arranged on the upper end of a rod 40, that is connected with a lever 42 (see Fig. 1), is actuated by a cam 43, so that the blind shall be lifted during the operation of the apparatus and an unobstructed view obtained.

In the printing and delivery of the notes, or cards, the end of a strip of paper, is led from a horizontal supply roll 44 to the surface of the type-wheel 14, Fig. 4, where it passes through a guide in the head of the feed lever 45 (Figs. 15 and 16), and then through a fixed guide 46, carrying the knife 47. (See also Figs. 11 and 12.) Immediately in rear of this guide, and opposite the rim of type-wheel 14, is the printing and inking lever 48, Fig. 10. The feed-lever 45 has its fulcrum on bolt 49, and is moved by a cam 50 on shaft 15, a spring 51 effecting the retraction. The head of the feed-lever is provided with a narrow passage through which the paper passes. See Figs. 15 and 16. A pin screw 52 enters into the slot from the front of the head, is carried on a lever 55 which is actuated by a spring 53. The lever 55 is pivotally connected with lever 45 by pin 54. A spring actuated lever 56, pivoted at 57, acts on lever 55. The lower arm of the lever 56 rests against the cams of disk 43, as shown in Fig. 2. One of the cams of disk 43 is in such relation to the above mentioned cam 50 that the lever 56 will not push lever 55 while the feed lever is swung to the left. The pin screw 52, will therefore hold the paper and force it to follow the motion of the feed lever. When the latter returns, however, the pin screw will be drawn out rearwardly and the paper will be free. The inking and printing lever 48, pivoted at 57, is oscillated by two cams of the same shape, on disk 43, twice around the type-wheel, while a spring 58, Fig. 2, is retracting against said cams. The first pressure against the type-wheel has for its object the inking of the type, for this is effected before the paper has been advanced over the type. Then the lever goes back and the paper is meanwhile advanced so that it receives the impression of the inked type, when the second cam throws the lever 48 forward. The head of lever 48 contains an ink-well provided with sponge, cotton, or other ink absorbing material, which reaches the type through an aperture 59. A piston-head, or follower 61 is operated by means of a screw and nut so as to keep the material at the opening 59 sufficiently moist to transfer the ink to the type, when the lever is moved against same. The feed lever 45 carries a slide, or plate 62 for covering the ink opening 59 during the actual printing and it thus forms a bed over which the paper is brought and printed. The feed lever returning to its normal position uncovers the ink-opening so that the type may be again inked preparatory to a second printing.

The knife 47 (Figs. 11 and 12) is pivotally connected with a lever 63, operating on pin 57. This lever is actuated by another suitable cam on the surface of the disk 43 so that the knife advances against the paper and severs it. After the impression is made, when a spring, not shown, retracts the lever, the severed piece of paper, or card, then falls into an inclined chute 64 and slides outwardly to a plate 65. See Fig. 1. Fig. 8 shows one of the printed notes, or cards. The type indicates by full kilograms only, but the position of the figure shows the fractional parts. The paper is marked, before the working of the apparatus, with a series of lines, one of which shall always appear across the middle of each ticket, or severed slip. If the weight be in full kilograms, the number will be printed directly on the aforesaid line. The fractional parts are indicated by the nearness of a number to said line. Thus in Fig. 8 the line being about equidistant from the two numerals, shows twenty-three and one-half kilograms.

The working of the apparatus is as follows: A person stepping on platform 23 depresses same and thereby tilts the lever 24 which presses upward the rods 26 and ring 27, which being engaged by the dog 28 of rod 20 raises said rod therewith and thus the running gear is wound up, hook 30 meanwhile engaging the ring 27 and thus securing same. The dog 28 having been pressed inward by coming in contact with the arm 22 releases the rod 20. Now the falling of a coin on the outer end of lever 36 will free the disk 34, and thus the running-gear will be set in motion. Meanwhile the scale has come to rest in equilibrium, and the type-wheel has turned so as to present the weight number in front of the head of the printing lever 48. The cam 50 produces an oscillation of the feed-lever 45, after the type has been inked by 48. The feed lever on returning covers the opening of the inker, with its plate 62. Then the lever 48 makes a second oscillation and prints the advanced end of the paper, which is next cut off by the knife 47 of lever 60, the musical instrument having in meantime been put in operation, and the blind removed from the line of sight of the stereoscope.

I do not desire to limit myself to the exact construction and arrangement of the several parts, as herein described, as it is evident that various modifications of same may be suggested, but What I do claim as new, and desire to secure by Letters Patent, is—

1. In coin-controlled apparatus, a weighing-scale having a series of weights arranged to operate on vertical rods, inclined angle-plates or shelves for supporting the weights when at rest, and means for successively raising the weights, substantially as set forth.

2. In coin-controlled apparatus, a weighing scale having weights adapted to operate on vertical rods, a series of angle-plates or shelves arranged on parallel inclines, the shelves narrowed as they extend upward, so that the weights when raised may clear the shelves, substantially as and for the purpose set forth.

3. In coin-controlled apparatus, a weighing mechanism consisting of a platform B, provided with a spring supported plate 23, and fulcrum 25 carrying a lever 24, rods 26 and 20, a ring 27 adapted to operate on the rod 20, said ring provided with trunnions to fit the upper end of the rods 26, and a dog 28 pivoted in a slotted portion of the rod 20, so as to engage the ring 27, and means whereby the rod 20 is tripped by a coin, substantially as and for the purpose specified.

4. In combination with the automatic weighing scales of a coin-controlled apparatus, a type-wheel and inking-lever, the head of the inking-lever provided with an ink well having means for compressing the inking material therein, an opening at the side of the ink-well, and a lever adapted to operate in front of said opening, the said lever provided with a plate to close the opening, or serve as a bed for the printing apparatus, substantially as set forth.

5. In a coin controlled apparatus provided with automatic scales, the combination of a type-wheel, an inking-device, and a paper-roll carrier, a feed lever and cutting device, the feed lever provided with a pivoted arm 55, spring 53, and a screw-pin 52, whereby the paper is held, at certain times, substantially as set forth.

In witness whereof I have hereunto set my hand in presence of two witnesses.

HERMANN SEIFERT.

Witnesses:
GUSTAV JÄGER,
EMIL ASCHENBACH.